(12) United States Patent
Duffy

(10) Patent No.: US 6,595,079 B2
(45) Date of Patent: Jul. 22, 2003

(54) COLLAPSIBLE STEERING COLUMN ASSEMBLY FOR A VEHICLE

(75) Inventor: Patrick Anthony Duffy, Leicester (GB)

(73) Assignee: NSK Steering Systems Europe Limited, Nottinghamshire (GB)

( * ) Notice: Subject to any disclaimer, the term of this patent is extended or adjusted under 35 U.S.C. 154(b) by 0 days.

(21) Appl. No.: 09/986,080

(22) Filed: Nov. 7, 2001

(65) Prior Publication Data

US 2002/0053252 A1 May 9, 2002

(30) Foreign Application Priority Data

Nov. 8, 2000 (GB) .............................................. 0027318

(51) Int. Cl.[7] .............................................. B62D 1/11
(52) U.S. Cl. ........................................ 74/492; 280/777
(58) Field of Search .............................. 74/492; 280/777

(56) References Cited

U.S. PATENT DOCUMENTS

| 4,098,141 A | * | 7/1978 | Yamaguchi | 74/492 |
| 5,052,240 A | * | 10/1991 | Miyoshi et al. | 74/493 |
| 5,262,364 A | * | 11/1993 | Brow et al. | 501/24 |
| 5,287,763 A | * | 2/1994 | Nagashima | 74/493 |
| 5,520,416 A | * | 5/1996 | Singer et al. | 280/775 |
| 5,588,332 A | * | 12/1996 | Hedderly | 74/493 |
| 5,593,183 A |  | 1/1997 | Fouquet et al. | 280/775 |
| 5,626,364 A | * | 5/1997 | Nakamura | 280/777 |
| 5,673,938 A | * | 10/1997 | Kaliszewski | 280/777 |
| 5,845,936 A | * | 12/1998 | Higashino | 280/775 |
| 5,944,348 A | * | 8/1999 | Boyle et al. | 280/777 |
| 6,260,883 B1 | * | 7/2001 | Shimizu et al. | 280/779 |
| 6,290,258 B1 | * | 9/2001 | Parkinson et al. | 280/775 |
| 6,324,935 B1 | * | 12/2001 | Schoen et al. | 74/493 |
| 6,343,523 B1 | * | 2/2002 | Castellon | 74/493 |

* cited by examiner

Primary Examiner—David A. Bucci
Assistant Examiner—Julie K. Smith
(74) Attorney, Agent, or Firm—Miles & Stockbridge P.C.

(57) ABSTRACT

A collapsible steering column assembly for a vehicle includes upper and lower steering column subassemblies that are slidable one within the other, the upper steering column subassembly being slidably mounted on a fixed mounting bracket mountable on a vehicle body part. The lower steering column subassembly includes, at its end remote from the upper subassembly, an intrusion bracket that is slidably mounted on the mounting bracket. Clamping means applies clamping force between the mounting bracket and the intrusion bracket to inhibit relative sliding movement of the mounting and intrusion brackets.

In the event of vehicle crash, the intrusion bracket and the steering assembly accommodates collapse from the front by intrusion of a firewall acting on the intrusion bracket. The clamping means run down a slot in the fixed bracket and the intrusion bracket runs in guideways in the fixed mounting bracket to accommodate the intruding firewall.

34 Claims, 2 Drawing Sheets

COLLAPSIBLE STEERING COLUMN ASSEMBLY FOR A VEHICLE

BACKGROUND OF THE INVENTION

This invention relates to a collapsible steering column assembly for a vehicle.

A vehicle steering column assembly is required to collapse in a controlled manner in the event of a vehicle crash. During a crash event, the steering column assembly should be able to accommodate collapse from the front of the vehicle, for example in order to accommodate intrusion of an engine compartment firewall and, in addition, the assembly should also be able to collapse away from the driver of the vehicle.

SUMMARY OF THE INVENTION

According to the present invention, there is provided a collapsible steering column assembly for a vehicle, the assembly including upper and lower subassemblies that are slidable one within the other, the upper subassembly being slidably mounted on a fixed mounting bracket mountable on a vehicle body part; and the lower subassembly including, at its end remote from said upper subassembly, an intrusion bracket that is slidably mounted on said mounting bracket, there being clamping means for applying clamping force between said mounting bracket and said intrusion bracket so as normally to inhibit relative sliding movement of the mounting and intrusion brackets but so as to allow such movement in the event of vehicle crash.

The intrusion bracket may also give support to a universal joint bearing assembly. This may be achieved through a pivot member pivotably mounted on the intrusion bracket.

The clamping means may include a clamping part extending through a guide slot in the mounting bracket and the clamping part may comprise at least one bolt connected to the intrusion bracket and tightened on either side of the guide slot. Two such bolts may be provided and the or each bolt may have a washer such as a plate washer to spread the tightening load on the edges of the guide slot. The or each washer may be coated with a low friction material to give a controlled breakaway load on the or each bolt, respectively. The guide slot may be recessed in a major surface of the mounting bracket and may extend parallel to the axis of the steering column. The slot may be a closed slot.

The pivot member may be connected to the intrusion bracket by means of pins that allow relative pivotal motion between the pivot member and the intrusion bracket. The intrusion bracket may be slidably mounted on the mounting bracket by means of complementary guideways.

The lower steering column subassembly may slide within the upper steering column subassembly and the two subassemblies may be interconnected through a profiled drive such as a spline interface.

An intermediate support bracket for the upper subassembly may be slidably mounted on the fixed mounting bracket in such a manner as to allow rake and/or reach adjustment of the steering column.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
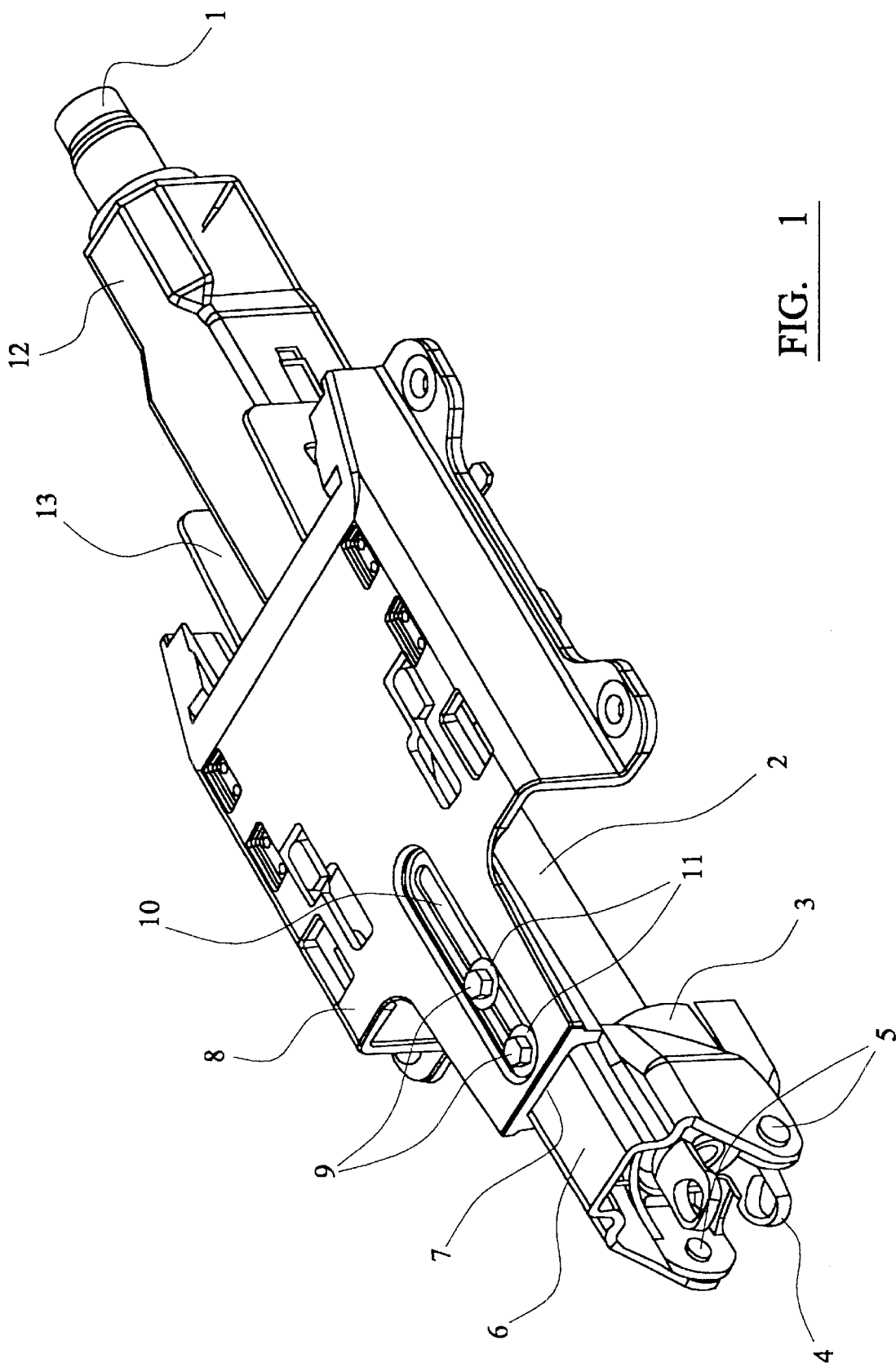
FIG. 1 is a diagrammatic perspective view of part of a collapsible steering column assembly for a vehicle shown in a condition before a vehicle crash.

The steering column assembly includes upper and lower column subassemblies in the form of an upper steering column tube 1 in which is slidably mounted a lower steering column tube 2, relative rotation between the two being prevented, for example, by a spline interface (not shown). A steering wheel (not shown) will be attached to the upper end of the tube 1, whilst the lower end of the lower tube 2 is coupled to a pivot member 3 in the form of a bracket, the pivot member 3 carrying a yoke of a universal joint 4.

The pivot member 3 is pivotally linked by pins 5 to an intrusion bracket 6 that is slidably mounted by complementary guideways 7 in a mounting bracket 8 that is intended to be fixed on a vehicle body part such as a cross-beam (not shown). The intrusion bracket 6 is clamped with a predetermined or controlled torque to the fixed mounting bracket 8 by means of a pair of bolts 9 located in a single, recessed guide slot 10 in the fixed mounting bracket 8, the slot 10 extending parallel to the axis of the steering column. Plate washers 11 are provided between the heads of the bolts 9 and the surfaces of the slot 10 to distribute the load generated by the applied torque and the washers 11 may be of, or coated with, a material of low coefficient of friction to give controlled breakaway loads.

The upper tube 1 is mounted on a support bracket 12 that is itself slidably mounted in a second, support bracket 13. The support bracket 13 is so mounted in the fixed mounting bracket 8 as to allow, in normal operating conditions of the steering column assembly, reach and/or rake adjustment of the steering column. Means are provided therefore to clamp the support bracket 13 to the support bracket 12 once the reach and/or rake adjustment of the steering column has been made.

Figure 2:
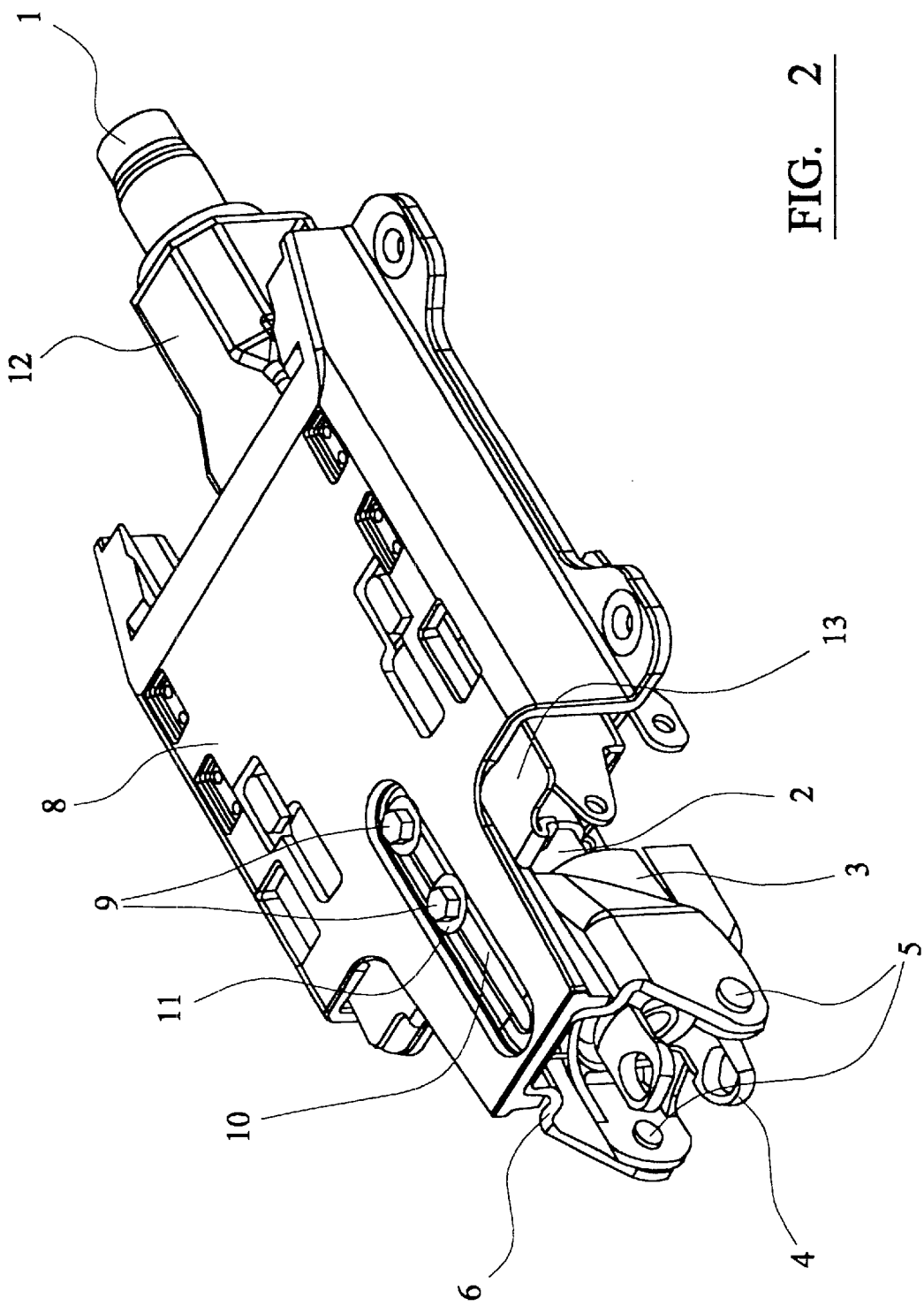
FIG. 2 is a view similar to FIG. 1 but showing the assembly in a condition that it can adopt after a vehicle crash.

As mentioned, in the event of vehicle crash, the steering column assembly should be able to accommodate collapse from the front, i.e. by intrusion of a firewall (not shown) and this is arranged to act on the intrusion bracket 6. It will be noted that, as shown in FIG. 1, the clamping bolts 9 are located towards one end of the slot 10 in the fixed bracket 8, namely the lower end of the slot 10 remote from the upper tube 1. Accordingly, the forces from impact of the firewall on the intrusion bracket 6 will be sufficient to overcome the clamping load of the bolts 9 which will be sufficient to force the intrusion bracket 6 to move in the direction of the slot 10 by means of the bolts 9 moving down the slot 10. The assembly of the yoke 4 and lower tube 2 and the pivot member or bracket 3 will, through the linkage of the pins 5 be displaced therefore in the same direction of the slot 10 and for the same displacement then as the intrusion bracket 6. In addition, the driver of the vehicle will also be able to displace the steering column away from the driver, so long as there is sufficient length for the lower subassembly tube 2 to collapse inside the upper subassembly tube 1. This is the condition shown in FIG. 2.

It will be appreciated that the intrusion bracket and slot arrangement allows for a predetermined collapse direction to be achieved whilst the length of the slot 10 defines the length of the intrusion and the loads generated can be predicted by suitably adjusting the torque on the bolts 9.

In addition, or instead of the guided slot clamping means, the breakaway control of the intrusion bracket with the mounting bracket may be achieved by a plastics material injected between the two parts. Thus, the two brackets are held together with a controlled breakaway load. Another possibility would be the use of riveting to provide the controlled breakaway load.

I claim:

1. A collapsible steering column assembly for a vehicle, the assembly comprising:
   upper and lower subassemblies that are slidable one within the other;
   the upper subassembly being slidably mounted on a fixed mounting bracket mountable on a vehicle body part;
   the lower subassembly including, at its end remote from the upper subassembly, an intrusion bracket that is slidably mounted on the mounting bracket; and
   clamping means for applying clamping force between said mounting bracket and said intrusion bracket so as normally to inhibit relative sliding movement of the mounting and intrusion brackets, but so as to allow said movement in the event of a vehicle crash.

2. A steering column assembly according to claim 1, wherein the intrusion bracket supports a universal joint bearing assembly.

3. A steering column assembly according to claim 2, wherein a pivot member is pivotably mounted on the intrusion bracket, thereby to support said universal joint bearing assembly.

4. A steering column assembly according to claim 1, wherein the mounting bracket has a guide slot and the clamping means includes a clamping part extending through the guide slot in the mounting bracket.

5. A steering column assembly according to claim 4, wherein said clamping part comprises at least one bolt connected to the intrusion bracket and tightened on either side of the guide slot.

6. A steering column assembly according to claim 5, wherein there are two of said bolts.

7. A steering column assembly according to claim 5, wherein the bolt has a washer to spread the tightening load on the edges of the guide slot.

8. A steering column assembly according to claim 7, wherein the washer is coated with a material having a low coefficient of friction providing a controlled breakaway load on the bolt.

9. A steering column assembly according to claim 4, wherein the guide slot is recessed in a major surface of the mounting bracket.

10. A steering column assembly according to claim 4, wherein the guide slot extends parallel to the axis of the steering column.

11. A steering column assembly according to claim 4, wherein the guide slot is a closed slot.

12. A steering column assembly according to claim 3, wherein the pivot member is connected to the intrusion bracket by pins that allow relative pivotal motion between the pivot member and the intrusion bracket.

13. A steering column assembly according to claim 1, wherein the intrusion bracket is slidably mounted on the mounting bracket by complementary guideways.

14. A steering column assembly according to claim 1, wherein the lower steering column subassembly is slidable within the upper steering column subassembly.

15. A steering column assembly according to claim 1, wherein the lower and upper steering column subassemblies are interconnected through a profiled drive.

16. A steering column assembly according to claim 1, wherein an intermediate support bracket is attached to the upper steering column subassembly and is slidably mounted on the fixed mounting bracket in such a manner as to allow rake adjustment of the steering column.

17. A steering column assembly according to claim 1, wherein an intermediate support bracket is attached to the upper steering column subassembly and is slidably mounted on the fixed mounting bracket in such a manner as to allow reach adjustment of the steering column.

18. A steering column assembly according to claim 7, wherein the washer is a plate washer.

19. A steering column assembly as recited in claim 1, wherein the mounting bracket is mountable to a cross-member of the vehicle.

20. A collapsible steering column assembly for a vehicle, comprising:
    upper and lower subassemblies that are slidable one within the other;
    the upper subassembly being slidably mounted on a fixed mounting bracket mountable on a vehicle body part;
    the lower subassembly including, at its end remote from the upper subassembly, an intrusion bracket that is slidably mounted on the mounting bracket; and
    a clamping member that clamps the mounting bracket and the intrusion bracket so as normally to inhibit relative sliding movement of the mounting and intrusion brackets, but so as to allow said movement in the event of a vehicle crash.

21. A steering column assembly according to claim 20, wherein the mounting bracket has a guide slot and the clamping member includes a clamping part extending through the guide slot.

22. A steering column assembly according to claim 21, wherein said clamping part comprises at least one bolt.

23. A steering column assembly according to claim 22, wherein the clamping part further comprises a washer coated with a material having a low coefficient of friction to give a controlled breakaway load on the bolt.

24. A steering column assembly according to claim 21, wherein the guide slot is recessed in a major surface of the mounting bracket.

25. A steering column assembly according to claim 21, wherein the guide slot extends parallel to the axis of the steering column.

26. A steering column assembly according to claim 21, wherein the guide slot is a closed slot.

27. A steering column assembly according to claim 20, wherein the intrusion bracket is slidably mounted on the mounting bracket by complementary guideways.

28. A steering column assembly according to claim 20, wherein the lower steering column subassembly is slidable within the upper steering column subassembly.

29. A steering column assembly according to claim 20, wherein the lower and upper steering column subassemblies are interconnected through a profiled drive.

30. A steering column assembly according to claim 20, wherein an intermediate support bracket is attached to the upper steering column subassembly and is slidably mounted on the fixed mounting bracket in such a manner as to allow rake adjustment of the steering column.

31. A steering column assembly according to claim 20, wherein an intermediate support bracket is attached to the upper steering column subassembly and is slidably mounted on the fixed mounting bracket in such a manner as to allow reach adjustment of the steering column.

32. A collapsible steering column assembly as recited in claim 20, wherein the mounting bracket is mountable to a cross-member of the vehicle.

33. A collapsible steering column assembly for a vehicle, comprising:

upper and lower subassemblies that are slidable one within the other;

the upper subassembly being slidably mounted on a fixed mounting bracket mountable on a vehicle body part;

the lower subassembly including, at its end remote from the upper subassembly, an intrusion bracket that is slidably mounted on the mounting bracket for sliding movement toward the upper subassembly to absorb impact of a primary collision; and a clamping member that clamps the mounting bracket and the intrusion bracket so as normally to inhibit said sliding movement, but so as to allow said sliding movement in response to a primary collision.

34. A steering column assembly as recited in claim 33, wherein the mounting bracket is mountable to a cross member of the vehicle.

* * * * *